United States Patent
Haken

(10) Patent No.: US 6,629,076 B1
(45) Date of Patent: Sep. 30, 2003

(54) METHOD AND DEVICE FOR AIDING SPEECH

(76) Inventor: Carl Herman Haken, 5 Old Neversink Rd., Danbury, CT (US) 06811

( * ) Notice: Subject to any disclaimer, the term of this patent is extended or adjusted under 35 U.S.C. 154(b) by 424 days.

(21) Appl. No.: 09/724,994

(22) Filed: Nov. 27, 2000

(51) Int. Cl.[7] .............................................. G10L 21/00
(52) U.S. Cl. ..................................... 704/271; 704/270
(58) Field of Search ................................ 704/270, 271; 359/618, 630; 345/632, 7, 8, 9

(56) References Cited

U.S. PATENT DOCUMENTS

| | | | | |
|---|---|---|---|---|
| 5,475,798 A | * | 12/1995 | Handlos | 704/277 |
| 6,005,536 A | * | 12/1999 | Beadles et al. | 345/7 |
| 6,091,546 A | * | 7/2000 | Spitzer | 359/618 |
| 6,311,155 B1 | * | 10/2001 | Vaudrey et al. | 704/225 |
| 6,349,001 B1 | * | 2/2002 | Spitzer | 359/618 |

* cited by examiner

*Primary Examiner*—Susan McFadden

(57) ABSTRACT

A real time visual display which enables a speaker to compare values of parameters in his own speech with measured values of acoustic information in the listener's environment. The speaker is thus able to use the display as feedback to adjust and modulate his own speech patterns to increase the listener's understanding. In a preferred embodiment of the invention, the visual display is presented to the speaker via a special set of eyeglasses.

20 Claims, 2 Drawing Sheets

METHOD AND DEVICE FOR AIDING SPEECH

BACKGROUND OF THE INVENTION

Speech information is not only conveyed by word patterns, but also by additional parameters which include the average and peak sound levels (volume), intonation and audio frequency (pitch) distribution which the speaker uses, for example, to convey feeling, emotion, urgency, disbelief and the like. The speaker applies and modulates these additional parameters based in part on past experience combined with information that is fed back to him from the listener's acoustic environment. The intelligibility of spoken information can thus be reduced under circumstances that impair the speaker's ability to hear and interpret these additional parameters in his own speech, to compare these parameters which background sound information in the listener's acoustic environment and to similar parameters in any reply which he receives from the listener.

A speaker's ability to hear and interpret additional speech parameters may arise as a result of disease or congenital defect which compromises the physically or neurologically challenged to sense and understand auditory information, from background sounds in either the speaker's or listener's acoustic environment which mask or otherwise disguise the sensed information or as a result of limitations or artifacts in a telephone or other communications channel which link a speaker with a remote listener. As used herein, the term "impaired hearing" can refer to any or all of these circumstances.

SUMMARY OF THE INVENTION

The invention provides a speaker with a real time visual display which enables him to compare values of parameters in his own speech with measured values of acoustic information in the listener's environment (including, without limitation, the parameters of any reply received from the listener) The speaker is thus able to use the displayed information as feedback to adjust and modulate his own speech patterns to increase the listener's understanding.

In a preferred embodiment of the invention, the visual display is presented to the speaker via a special set of eyeglasses. The displayed information may be superimposed as a heads-up display on a partially reflecting lens of the eyeglasses or may be contained in the eyeglass frames and appear at an edge or corner of the eyeglass lens.

DESCRIPTION OF THE DRAWINGS

The invention is described with reference to the attached drawings in which.

DESCRIPTION OF THE EMBODIMENTS

Figure 1:
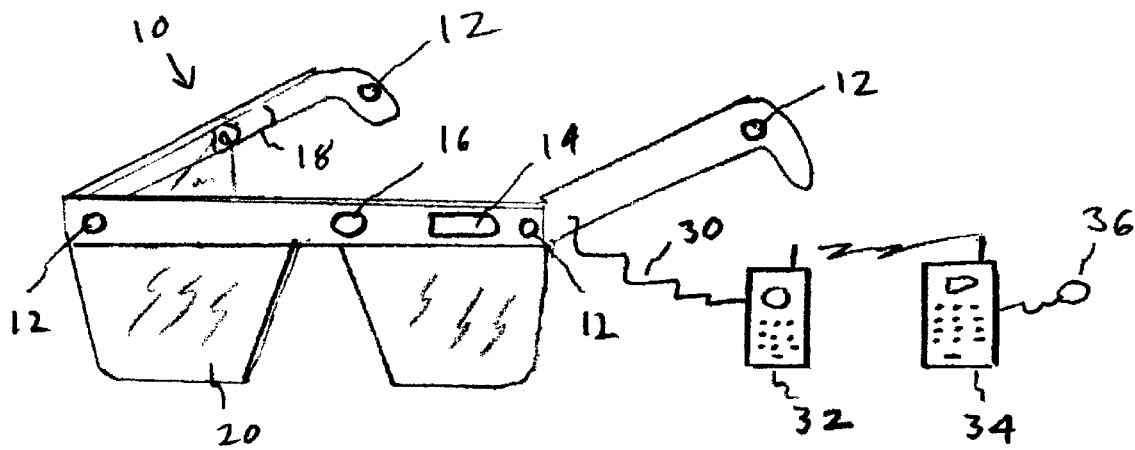
FIG. 1 shows a device in accordance with the invention.

FIG. 1 shows a device in accordance with the invention. A pair of eyeglasses 10 are provided with one or more microphones which are used alone or in combination receive and monitor sounds, including the wearer's own speech, at the wearer's location. Attached to, or imbedded in, the eyeglass frame is a processor 14 and battery 16. A display generator is also attached to or included within the frames. In a preferred embodiment the display generator is a projector 18 which produces a graphical display that can be viewed by the wearer on surface of a partially reflecting lens 20.

If a listener is collocated with the speaker, one or more of the microphones 12 can be oriented to preferentially receive sound from the wearer's speech while others of the microphones 12 are oriented to preferentially receive sound that originates away from the speaker in his local environment. In the case where the listener is at a remote location, means are provided for sensing sound in the listener's environment and for transmitting those sounds to the processor 14. For this purpose, the processor 14 may be connected via cable 30 to a first cellular telephone 32 which in turn receives the information from a second cellular telephone 34 at the listener's remote location. If necessary, the second telephone 34 may be equipped with a detachable microphone 36 sense sounds at a different position or direction than the integral microphone in the telephone 34. Alternatively, the cellular telephones 34, 34 may be replaced with other known systems, including for example, short range radio links which communicate using a Bluetooth standards, a police or aircraft radio channel, or a hardwired telephone connection.

If desired a throat, noise canceling or boom microphone may be used to further isolate the speaker's voice from environmental sounds.

Figure 2:
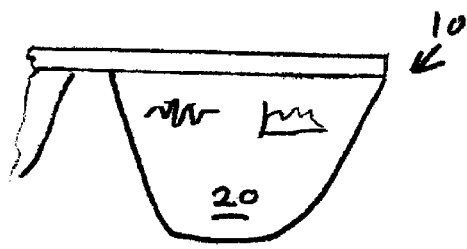
FIG. 2 shows a preferred heads-up display.

FIG. 2 shows a preferred embodiment of the visual display that is projected from display generator onto a partially reflecting lens of the eyeglasses.

Figure 3:
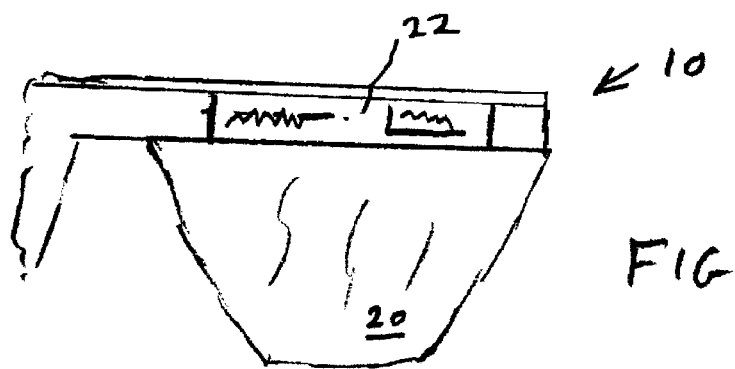
FIG. 3 shows a display which is included in an eyeglass frame.

FIG. 3 shows an alternate embodiment of the display which is produced by a LED or LCD display 22 is attached to the eyeglass from at the top edge and corners of a lens 20a. The eyeglass lenses may be tinted, corrective protective or Plano depending upon the individual needs of the wearer.

Figure 4:
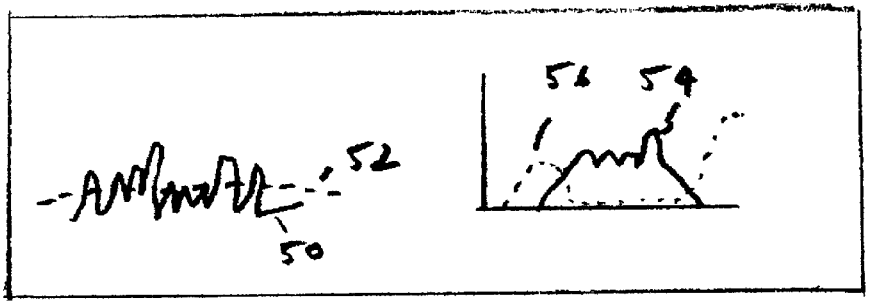
FIGS. 4–7 show various display formats.
Figure 5:
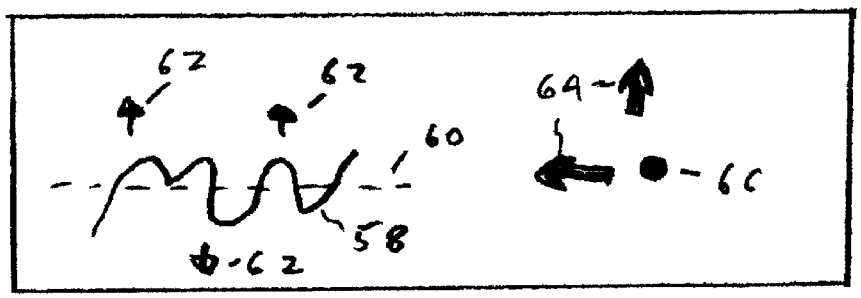
Figure 6:
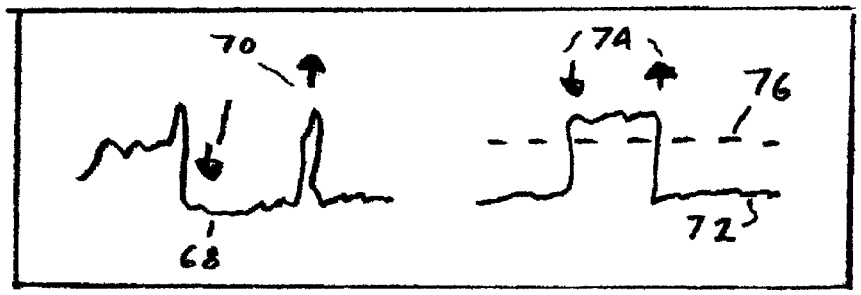

The processor 14 uses known audio measurement and analysis algorithms to generate low displays for the speaker. FIGS. 4–6 show several examples of displays that can be presented, it being understood that the specific display will be adjusted to the needs of a specific situation and user.

FIG. 4 shows a display that can be useful in the case where the speaker and listener are collocated in an acoustic environment that may mask the speaker's words. Display line 50 at the left, which may be presented in a first color or brightness level represents the instantaneous level of the detected sound, as received from a microphone which preferentially receivers the speaker's voice, while superimposed line 52, which should be displayed using a different color or brightness level shows the average level of background sound at the location. Display lines 54 and 56 at the right of the display similarly show the instantaneous and average spectrum of acoustic frequencies at the same location. The time period for taking the average sound level and spectrum can be adjusted depending on the application and might vary from several seconds in an airport or train station environment, to several minutes in a heavy machinery cab or factory environment.

FIG. 5 is a display which can be useful a person who is unable to hear or understand her own speech sounds. In this case line 58 indicates the average level of the wearer's speech, line 60 indicates the average background sound level and arrows 62 indicate time and amount of changes in the speaker's intonation. If desired arrows 64 in the right part of the display can be used, in a known manner to indicate the direction of loud local sounds, as determined by directional microphones in the eyeglass frame and other indicators 66 could be used to indicate detection of an potentially dangerous condition, for example detection of a siren or smoke alarm sound.

FIG. 6 shows a display that could be used when the listener is at a remote location from the speaker. The line 68 and arrows 70 of the left display indicate the speaker's instantaneous speech level and intonation while the line 72 and arrows 74 of the right display indicate the level and intonation of the listener's reply. Line 76 indicates the average sound level at the listener's location.

Figure 7:
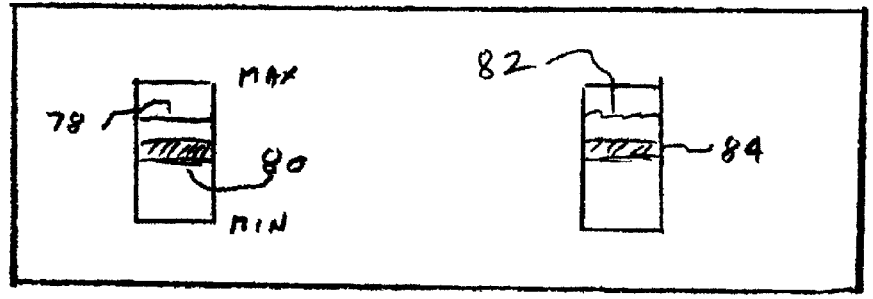

FIG. 7 shows an alternate display bar graph display format. In the left display the speaker's instantaneous speech sound level is indicated by line 78 while the local average sound level is indicated by band 80. Likewise in the right display the speaker's average voice pitch is indicated by line 82, while the average pitch of the surrounding environmental sound is indicated by band 84.

What is claimed is:

1. A device for aiding speech when hearing is impaired comprising:
    means for monitoring values of listener sound parameters at a listener's location and for
    transmitting said values to a speaker's location;
    means for monitoring values of speech sounds at a speaker's location; and
    display means which provide the speaker with a real time visual representation which compares the values of the monitored listener sound parameter values with the monitored speech sound values.

2. The device of claim 1, wherein the display means comprise eyeglasses.

3. The device of claim 2 wherein the display means present the visual representation as a head's-up display which is superimposed over an image which can be viewed through a lens of the eyeglasses.

4. The device of claim 2 wherein the display means present the visual representation at an edge or corner of an image which can be viewed through a lens of the eyeglasses.

5. The device of claim 2 wherein the listener sound parameters comprise one or more of an average ambient sound level, a peak sound level, and audio frequency distribution values.

6. The device of claim 5 wherein the listener's location is substantially collocated with the speaker's location.

7. The device of 5 claim wherein the listener's location is remote from the speaker's location and wherein the means for transmitting includes wireless means for transmitting the data values.

8. The device of claim 7 wherein the means for transmitting includes a cellular telephone.

9. The device of claim 7 wherein the means for transmitting includes a short-range radio frequency channel operating in accordance with Bluetooth standards.

10. The device of claim 1 wherein the listener sound parameters comprise one or more of an average ambient sound level, a peak sound level, and audio frequency distribution values.

11. The device of claim 10 wherein the listener's location is substantially collocated with the speaker's location.

12. The device of 10 claim wherein the listener's location is remote from the speaker's location and wherein the means for transmitting includes wireless means for transmitting the data values.

13. The device of claim 12 wherein the means for transmitting includes a cellular telephone.

14. The device of claim 12 wherein the means for transmitting includes a short-range radio frequency channel operating in accordance with Bluetooth standards.

15. A device for aiding speech when hearing is impaired comprisig:
    means for monitoring values of speech sounds at a speaker's location; and display means which provide the speaker with a real time visual of the monitored listener sound parameter values of the monitored speech sound values.

16. The device of claim 15, wherein the display means comprise eyeglasses.

17. The device of claim 16 wherein the display means present the visual representation as a head's-up display which is superimposed over an image which can be viewed through a lens of the eyeglasses.

18. The device of claim 17 wherein the speech values comprise one or more of an average ambient sound level, a peak sound level, audio frequency distribution values, and intonation values.

19. A method for increasing the intelligibility of speech when hearing is impaired comprising:
    A device for aiding speech when hearing is impaired comprising:
    monitoring values of listener sound parameters at a listener's location
    monitoring values of speech sounds at a speaker's location; and
    providing the speaker with a real time visual representation which compares the values of the monitored listener sound parameter values with the monitored speech sound values.

20. The method of claim 19 further comprising displaying the visual representation via eyeglasses which are worn by the speaker.

* * * * *